3,712,834
DEFERRED ACTION BATTERY

James B. Doe, Levittown, and Richard P. Niederberger, Pineville, Pa., and Michael C. Curcio and Michael H. Forker, Trenton, N.J. (all % ESB Incorporated, P.O. Box 8109, Philadelphia, Pa. 19101)
Filed Oct. 15, 1971, Ser. No. 189,513
Int. Cl. H01m 21/00
U.S. Cl. 136—114        4 Claims

ABSTRACT OF THE DISCLOSURE

A deferred action battery is described having a cylindrical plastic container with metallic terminal contact pieces at either end. The battery plates are annular in shape and define a central cylindrical cavity. Within the cavity are located a biscuit of dry pressed electrolyte, an ampoule containing a solution of potassium chromate, and a plunger. A portion of the plunger passes through the top of the battery container. The battery is activated by forcing the plunger into the ampoule causing it to break. The liquid within then dissolves the perchlorate to give the desired electrolyte which then permeates and activates the battery.

BACKGROUND OF THE INVENTION (a) Field of the invention

This invention relates to primary electrochemical batteries. In particular, it relates to a deferred action primary battery.

(b) Description of the prior art

A deferred action primary battery is one in which the active chemical materials are kept away from each other until the battery is put into use. This permits of an indefinitely long storage period without any deterioration in the electrical performance of the battery. A most convenient way to separate the battery chemicals is to store the electrolyte in a separate container away from the plates. The plates in most forms of battery are located apart from one another and held apart by the battery separators. To activate the battery, the electrolyte is caused to fill the battery proper.

Deferred action batteries embodying the above features have been built and used for many years. A great deal of effort has been expended to provide a battery having maximum power output per unit weight or volume and at the same time provide maximum reliability and minimum chance for premature activation.

It is often desirable to provide a reserve type battery system that will provide reliable power over a broad range of temperatures and particularly at low temperatures. Unfortunately, the more common battery couples suffer considerable loss in performance when operated at low temperatures. For outstanding characteristics, some of the lesser known couples are required. Two such couples are the manganese dioxide-magnesium cell with magnesium perchlorate electrolyte and the mercuric oxide-magnesium cell with the same electrolyte. These cells operate at a high voltage level, i.e. approximately 2 volts per cell.

In order to make the perchlorate battery operate satisfactorily at low ambient temperatures, some form of heating must be used. Battery heating devices have been described ranging from electric heaters (requiring an external power supply) to various forms of chemical heaters, including pyrotechnic devices. For small batteries, a desirable heating device would be simple in concept, simple to use and require a minimum of space.

SUMMARY OF THE INVENTION

A non-metallic container having a metallic top and bottom portion, the two metallic parts forming the terminals of the battery, contain one or more annular anodes and one or more annular cathodes. Means separating the anodes from the cathodes is provided. The opening in the center of the plates forms a cylindrical cavity in which is located a frangible ampoule containing an electrolyte solution. A pellet of electrolyte producing salt is also located in the cylindrical cavity below the ampoule. A diaphragm member seals the cavity thereby sealing the electrodes, the pellet and the ampoule from the effects of the ambient atmosphere. A plunger is located on the axis of the cavity. To activate the battery, the plunger is pressed down until flush with the top of the battery. This ruptures the diaphragm, breaks the ampoule and allows the solution to fall on the salt which rapidly dissolves to give the desired electrolyte, thus activating the cell.

DESCRIPTION OF THE PREFERRED EMBODIMENT

Figure 1:
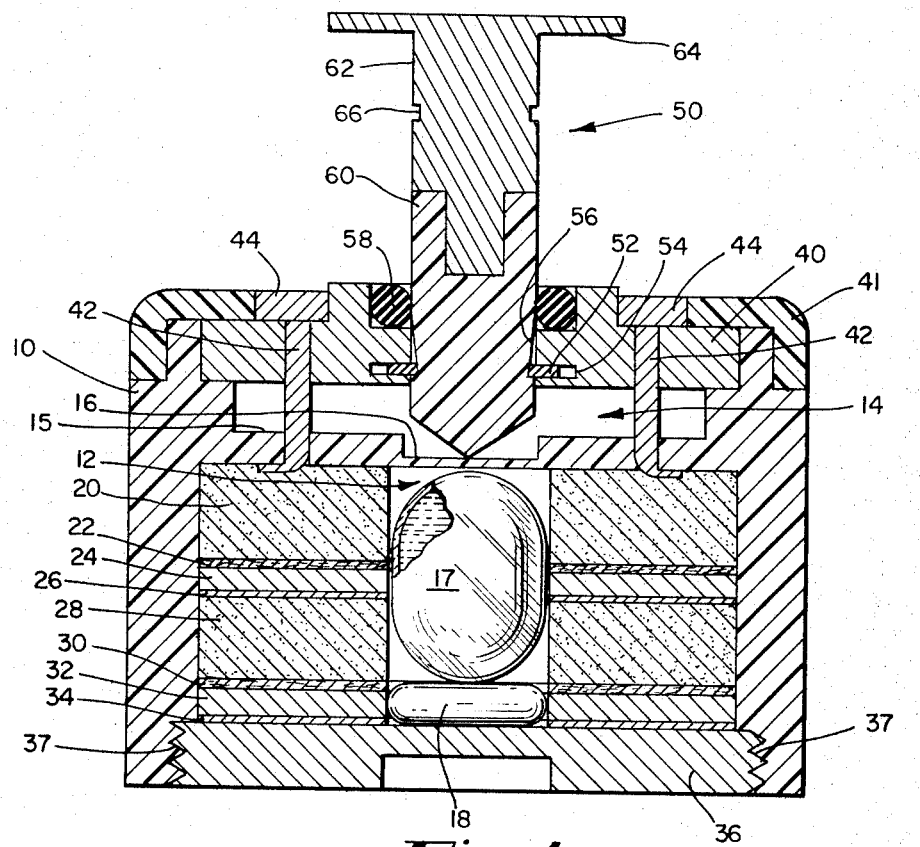
FIG. 1 is a cross section of a typical two cell battery of the invention prior to activation; and, FIG. 2 is a cross section of the same battery after activation.

In FIG. 1, 10 represents a cylindrical plastic battery container. Two principal cavities are formed in container 10, namely, a large cavity 12 in which the batery components proper are located and a smaller cavity 14. A partition 15 separates cavity 12 from cavity 14 and forms an hermetic seal between the two. A portion 16 of partition 15 is thinner than the rest and forms a frangible diaphragm.

Within the cavity 12 are located in sequence: an annular cathode 20. Next is an annular separator 22 of glass mat or other mat material chemically inert to the electrolyte. An anode 24 also annular in shape follows. A ring of stainless steel 26 forms a contact member between the anode 24 and the cathode of the second cell 28. The remaining parts of the second cell correspond to those of the first cell, namely, a separator 30, anode 32 and a contact member 34. A metallic portion 36 of the bottom of the battery is arranged to screw down on the contact member 34 via screw thread 37 to provide needed compression to the assembly as well as forming one of the terminal contacts for the battery. The metallic bottom 36 is hermetically sealed to container 10 by a suitable cement placed in thread 37. Also located within cavity 12 in the central opening formed by the cell parts 20 to 34 is a frangible ampoule 17 containing electrolyte liquid and a pellet 18 of electrolyte producing salt.

Cavity 14 is formed by the partition 15, the walls of container 10 and a metallic closure 40. One or more leads 42 connect the cathode 20 to the closure 40 and are fastened thereto by the solder shown at 44. The closure 40 is attached to the container 10 by a circular plastic clamp 41.

A plunger 50 is located on the axis of the battery and protrudes above the battery closure 40. The plunger 50 centers on the frangible diaphragm 16 as well as the ampoule of liquid 17. The plunger 50 is held away from the diaphragm 16 by the tension of a split retaining ring 52 located in a groove 54 in the closure 40 and engaging a conical groove 56 in the circumference of the plunger 50. A sealing ring such as a rubber O-ring 58 seals the opening between the plunger 50 and the closure 40. The sealing ring is proportioned so that it will allow the escape of gas from cavity 14 to the atmosphere if excessive pressure should build up.

The plunger 50 is made of two parts: a lower part 60 made of non-conductive material such as plastic, and an upper 62 made of metal. To activate the battery, plunger 50 is pushed down into the battery until the metallic top 64 of the plunger rests on the battery closure 40. In this position, the metallic top 64 becomes a second terminal of the battery, getting electrical contact through the split retaining ring 52. The lower portion 60 of plunger 50 is now located in the center of the battery element where the ampoule 17 was formerly located.

Figure 2:
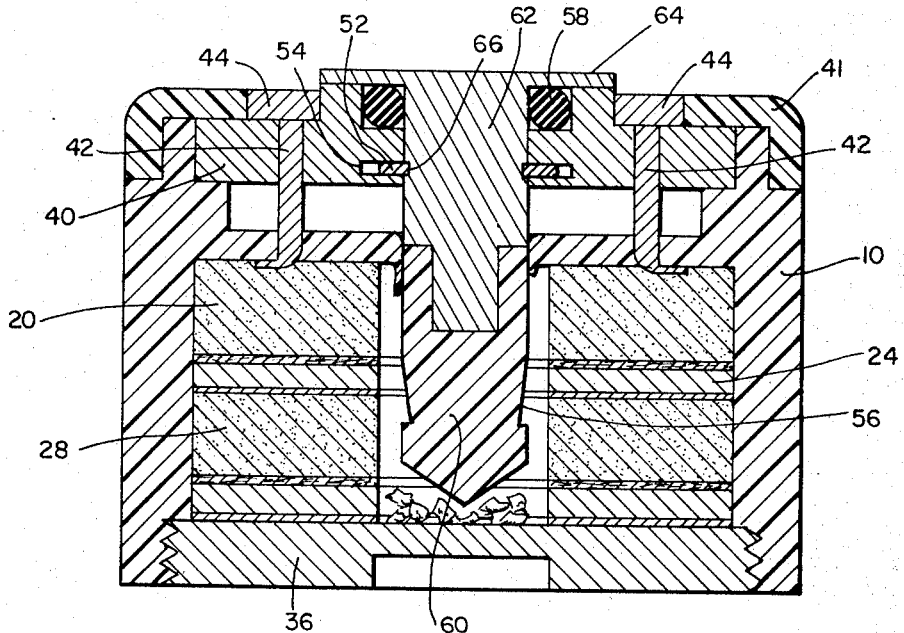

In FIG. 2, the battery is shown in the activated condition after plunger 50 has been forced through diaphragm 16 and has broken the ampoule 17 allowing the electrolyte liquid within to dissolve the salt pellet 18 to produce the required electrolyte and the electrolyte so formed has permeated the various cell members i.e., the cathode mix, the separators, and the surface of the anode.

It will be observed that the electrical circuit of the battery described above comprises two cells in series. It is also observable that there will be some leakage currents passing from the second cell to the first. The leakage is due to having a common electrolyte.

It is controlled by the use of just enough electrolyte to wet down the cells and by the wicking action of the separators 22 and 30 which suck up all the free electrolyte. The lower portion 60 of the plunger 50 being made of plastic does not provide an electrical short circuit between the cells.

Under certain operating conditions, gas may be evolved either from heat or from decomposition of the electrolyte. The cavity 14 provides a reservoir for such gas. Normally, the cavity will contain all the gas. However, if under abnormal conditions excessive gas is produced, it will escape around the sealing ring 58 as described above.

Pressure within the battery will also act on the plunger 50, forcing it out of the battery. This is prevented by the split retaining ring 52 which snaps into a second circular groove 66 formed on the surface of plunger 50. The locking action of the split ring 52 is clearly shown in FIG. 2.

Although many electrode and electrolyte combinations can be used in the construction of the invention, two combinations are most desirable, namely, the magnesium-manganese dioxide couple and the magnesium mercuric oxide couple. For either of these couples, a magnesium perchlorate electrolyte is excellent. In the first of these, the cathode comprises the usual mix of manganese dioxide and carbon black. In the second, mercuric oxide plus a conductor such as silver powder is used. The anode is usually a sheet of magnesium alloy such as that known as AZ–21 or AZ–31. A suitable electrolyte is 5 normal magnesium perchlorate solution.

When magnesium perchlorate is dissolved in water, considerable heat is given off. This reaction is used in the present invention as a means to heat the battery for low temperature operation. A dry pressed pellet of magnesium perchlorate is located directly under a frangible ampoule containing water. A freezing point depressant is added to the water to prevent it from freezing at low ambients. It is also desirable to add a corrosion inhibitor to the electrolyte to reduce as much as possible the local action of the magnesium alloy electrode in electrolyte. Potassium chromate added to the water in the ampoule serves both as a freezing point depressant and corrosion inhibitor. It has been found that even at temperatures as low as −40° C. the pellet of perchlorate will dissolve in fractions of a second in the chromate solution.

EXAMPLE

A two cell battery having an outside diameter of 1.0 inch and an overall height of 0.75 inch (after activation) has an open-circuit voltage of 3.0–4.0 volts, weighs 31 gms. and has a 0.75 amp-hr. capacity to 2.0 volts. This represents a specific work output of 35 watt-hrs. per pound. This work is deliverable at any battery temperature between −40° C. and +50° C.

Having described our invention, we hereby claim:

1. A deferred action battery which comprises:
   (a) a non-metallic cylindrical container having a metallic top portion forming one electrical terminal of the battery and a metallic bottom portion forming a second electrical terminal of the battery;
   (b) at least one cylindrical cell element located within and concentric with the container, the cell element comprising at least one annular anode and one annular cathode with separating means positioned between anode and cathode;
   (c) the cell elements defining a cylindrical cavity concentric with the container; and,
   (d) located in the so-defined cavity in sequence starting from the metallic bottom portion of the container, a solid dry pellet of electrolyte producing salt, a frangible ampoule containing liquid into which the salt may be dissolved and a plunger passing through the top portion of the container operable to break the frangible ampoule.

2. A battery as defined in claim 1 further identified by having hermetic seal means located between the cell element and the plunger, sealing the cell element from the atmosphere and frangible by the plunger prior to its breaking the ampoule.

3. A battery as defined in claim 1 in which the anode is magnesium alloy, the cathode manganese dioxide mix, the liquid in the ampoule potassium chromate solution, and the pellet magnesium perchlorate.

4. A battery as defined in claim 1 in which the anode is magnesium alloy, the cathode mercuric oxide, the liquid in the ampoule potassium chromate solution and the pellet magnesium perchlorate.

References Cited

UNITED STATES PATENTS

| 2,993,946 | 7/1961 | Lozier | 136—90 |
| 3,239,385 | 3/1966 | Meyers | 136—90 |
| 3,464,863 | 9/1969 | Barron | 136—114 |
| 3,514,339 | 5/1970 | Powers | 136—113 |
| 3,669,753 | 6/1972 | Kaye | 136—114 |

ANTHONY SKAPARS, Primary Examiner

U.S. Cl. X.R.

136—90